(12) United States Patent
Hu et al.

(10) Patent No.: US 11,783,565 B2
(45) Date of Patent: Oct. 10, 2023

(54) IMAGE PROCESSING METHOD, ELECTRONIC DEVICE AND READABLE STORAGE MEDIUM FOR MAINTAINING A FACE IMAGE BUFFER QUEUE

(71) Applicant: BEIJING BAIDU NETCOM SCIENCE AND TECHNOLOGY CO., LTD., Beijing (CN)

(72) Inventors: Yuexiang Hu, Beijing (CN); Renyi Zhou, Beijing (CN); Junyu Han, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 304 days.

(21) Appl. No.: 17/241,191

(22) Filed: Apr. 27, 2021

(65) Prior Publication Data
US 2021/0397873 A1 Dec. 23, 2021

(30) Foreign Application Priority Data
Jun. 17, 2020 (CN) .......................... 202010555785.4

(51) Int. Cl.
*G06K 9/62* (2022.01)
*G06V 10/44* (2022.01)
(Continued)

(52) U.S. Cl.
CPC ........ *G06V 10/443* (2022.01); *G06F 16/5866* (2019.01); *G06V 20/46* (2022.01);
(Continued)

(58) Field of Classification Search
CPC ............ G06V 40/16–40/179; H04N 21/44004
See application file for complete search history.

(56) References Cited

U.S. PATENT DOCUMENTS

| 2011/0212717 A1 | 9/2011 | Rhoads et al. |
| 2017/0116465 A1 | 4/2017 | Ma et al. |

(Continued)

FOREIGN PATENT DOCUMENTS

| CN | 109309817 A | 2/2019 |
| CN | 110263680 A | 9/2019 |

(Continued)

OTHER PUBLICATIONS

Extended European Search Report of European application No. 21169915.2, dated Oct. 25, 2021, 10 pages.

(Continued)

*Primary Examiner* — Brian Werner
(74) *Attorney, Agent, or Firm* — Brooks Kushman P.C.

(57) ABSTRACT

An image processing method, an electronic device and a readable storage medium, which relate to the technical field of computer vision, are disclosed. In an embodiment, a face recognition module and a service processing module maintains respectively an image buffer queue; the face recognition module maintains a face image buffer queue of face images, and the service processing module maintains a background image buffer queue of background images, i.e., first images; since the face recognition module only maintains the face image buffer queue, only a determined optimal face image, i.e., a face image to be matched, is transmitted to the service processing module, and then, the service processing module determines a background image matched with the optimal face image transmitted by the face recognition module from the maintained background image buffer queue, thus performing image recognition and image matching on a face appearing in a video source.

16 Claims, 4 Drawing Sheets

(51) Int. Cl.
  *G06F 16/58* (2019.01)
  *G06V 40/16* (2022.01)
  *G06V 20/40* (2022.01)
(52) U.S. Cl.
  CPC .......... *G06V 40/166* (2022.01); *G06V 40/169* (2022.01); *G06V 40/172* (2022.01)

(56) References Cited

U.S. PATENT DOCUMENTS

| | | |
|---|---|---|
| 2017/0236407 A1 | 8/2017 | Rhoads et al. |
| 2018/0233028 A1 | 8/2018 | Rhoads et al. |
| 2021/0158049 A1* | 5/2021 | Leppänen ............... G11B 27/34 |
| 2021/0241607 A1 | 8/2021 | Rhoads et al. |
| 2021/0279475 A1 | 9/2021 | Tusch et al. |

FOREIGN PATENT DOCUMENTS

| | | |
|---|---|---|
| CN | 111241927 A | 6/2020 |
| JP | 2005323046 A | 11/2005 |
| JP | 2010021853 A | 1/2010 |
| WO | 2018020275 A1 | 2/2018 |

OTHER PUBLICATIONS

Qiao et al. "Face Recognition System based on Image Processing," Shanxi Electronics Technology, vol. 06, Dec. 15, 2017, 3 pages.

Xu et al., "Design of Near-Infrared Face Recognition System Based on Embedded Technique", ISSN 1004-9037, CODEN SCYE4, Journal of Data Acquisition and Processing, vol. 30, No. 1, Jan. 2015, pp. 211-218, 16 pages.

* cited by examiner

IMAGE PROCESSING METHOD, ELECTRONIC DEVICE AND READABLE STORAGE MEDIUM FOR MAINTAINING A FACE IMAGE BUFFER QUEUE

CROSS-REFERENCE TO RELATED APPLICATIONS

The present disclosure claims the priority and benefit of Chinese Patent Application No. 202010555785.4, filed on Jun. 17, 2020, entitled "IMAGE PROCESSING METHOD AND APPARATUS, ELECTRONIC DEVICE AND READABLE STORAGE MEDIUM." The disclosure of the above application is incorporated herein by reference in its entirety.

TECHNICAL FIELD

The present disclosure relates to the computer technology field, particularly to an artificial intelligence technology, and more particularly to an image processing method, an electronic device and a readable storage medium.

BACKGROUND

In the video monitoring field, collection of a video only by an image collection device is still far from enough, and usually, image recognition and image matching are required to be performed on a face appearing in the video, such that a user may perform a service with a safety-related requirement.

Therefore, it is desirable to provide an image processing method for performing image recognition and image matching on a face appearing in a video source.

SUMMARY

Aspects of the present disclosure provide an image processing method, an electronic device and a readable storage medium, for performing image recognition and image matching on a face appearing in a video source.

According to a first aspect, there is provided an image processing method, including: acquiring, by a face recognition module, a face image buffer queue maintained by the face recognition module, herein the face image buffer queue includes one or more face images and a first timestamp corresponding to each of the one or more face images; and each face image and the first timestamp corresponding thereto are obtained by the face recognition module based on original images from a video source; determining, by the face recognition module, a face image to be matched from the face image buffer queue; and sending, by the face recognition module to a service processing module, the face image to be matched and the first timestamp corresponding thereto, such that the service processing module determines a first image consistent with the first timestamp corresponding to the face image to be matched, from a background image buffer queue maintained by the service processing module, according to the first timestamp corresponding to the face image to be matched, to serve as a matched image of the face image to be matched, and performs service processing according to the face image to be matched and the matched image thereof; herein the first image is an original image acquired by the service processing module; herein the face recognition module and the service processing module run on different hardware platforms.

According to a second aspect, there is provided another image processing method, including: receiving, by a service processing module from a face recognition module, a face image to be matched and a first timestamp corresponding thereto, herein the face image to be matched is determined by the face recognition module from a face image buffer queue maintained by the face recognition module; the face image buffer queue includes one or more face images and a first timestamp corresponding to each of the one or more face images; and each face image and the first timestamp corresponding thereto are obtained by the face recognition module based on original images from a video source; determining, by the service processing module, a first image consistent with the first timestamp corresponding to the face image to be matched, from a background image buffer queue maintained by the service processing module, according to the first timestamp corresponding to the face image to be matched, to serve as a matched image of the face image to be matched, herein the first image is an original image acquired by the service processing module; and performing, by the service processing module, service processing according to the face image to be matched and the matched image thereof; herein the face recognition module and the service processing module run on different hardware platforms.

According to a third aspect, there is provided an electronic device, including: at least one processor; a memory connected with the at least one processor communicatively; herein the memory stores instructions executable by the at least one processor to enable the at least one processor to perform the method of the first or second aspect as described above and any possible implementation.

According to a fourth aspect, there is provided a non-transitory computer readable storage medium including instructions which, when executed by a computer, cause the computer to carry out the method of the first or second aspect as described above and any possible implementation.

From the above-mentioned technical solution, in the embodiments of the present disclosure, the face recognition module and the service processing module maintains respectively an image buffer queue; that is, the face recognition module maintains a face image buffer queue of face images, and the service processing module maintains a background image buffer queue of background images, i.e., first images; since the face recognition module only maintains the face image buffer queue, only a determined optimal face image, i.e., a face image to be matched, is transmitted to the service processing module, and the service processing module determines a background image matched with the optimal face image transmitted by the face recognition module in the background image buffer queue, thus performing the image recognition and image matching on the face appearing in the video source.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

In order to more clearly explain the technical solutions of the embodiments of the present disclosure, the drawings to be used in the descriptions of the embodiments or the prior art are briefly introduced as follows. Apparently, the following drawings illustrate some embodiments of the present disclosure, and a person skilled in the art can obtain other drawings from these drawings without any creative effort. The drawings are only used for better understanding the present solution and do not constitute a limitation of the present disclosure. In the drawings.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Apparently, the embodiments to be described are merely exemplary. All other embodiments obtained by a person of ordinary skill in the art based on the embodiments of the present disclosure without creative efforts shall fall within the protection scope of the present disclosure.

It should be noted that a terminal in the embodiments of the present disclosure may include, but is not limited to, a mobile phone, a personal digital assistant (PDA), a wireless handheld device, a tablet computer, a personal computer (PC), an MP3 player, an MP4 player, a wearable device (for example, smart glasses, smart watches, smart bracelets, or the like), a smart home device, and other smart devices.

In addition, the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

An image processing system having a same-source and heterogeneous architectures means that there is a same video source, and other processing modules belong to heterogeneous architectures. In the image processing system with the same-source and heterogeneous architectures for which the technical solution of the present disclosure is suitable, a face recognition module and a service processing module run on two or more hardware platforms respectively and belong to the heterogeneous architectures.

For example, in some service scenarios, a face is recognized from a monitoring video source to obtain a face image, and meanwhile, the face image is further matched with a corresponding video frame image, and is completely provided to a user by the service processing module, Under such heterogeneous architectures, how to perform the image matching is an important technical problem.

Based on the above-mentioned problem, the present disclosure proposes an image processing method which is able to perform image recognition and image matching on the face appearing in the video source.

Figure 1:
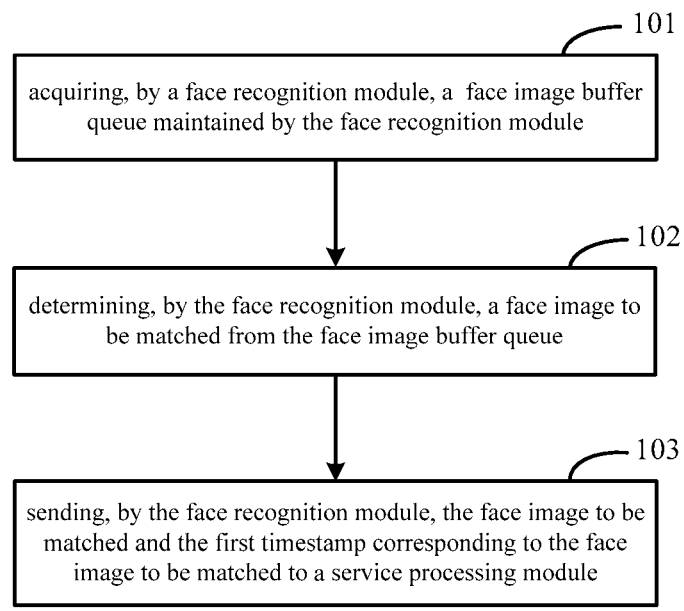
FIG. 1 is a schematic diagram according to a first embodiment of the present disclosure.

FIG. 1 is a schematic diagram according to a first embodiment of the present disclosure, and a face recognition module and a service processing module included in FIG. 1 run on different hardware platforms.

101: acquiring, by the face recognition module, a face image buffer queue maintained by the face recognition module.

The face image buffer queue may include, but not limited to, one or more face images and a first timestamp corresponding to each of the one or more face images.

Each face image and the first timestamp corresponding thereto are obtained by the face recognition module based on original images from a video source.

After receiving the original images from the video source, in order to globally and uniquely mark the original images, the face recognition module may add the first timestamps ranging from 0 to infinity to the original images, respectively. Then, the face recognition module may further use a face recognition technology to perform the face recognition on the original image from the video source, so as to obtain one or more face images in the original image from the video source.

102: determining, by the face recognition module, a face image to be matched from the face image buffer queue.

103: sending, by the face recognition module, the face image to be matched and the first timestamp corresponding thereto to the service processing module.

At this point, after receiving the face image to be matched and the first timestamp corresponding thereto sent by the face recognition module, the service processing module may determine a first image consistent with the first timestamp corresponding to the face image to be matched, from a background image buffer queue maintained by the service processing module, according to the first timestamp corresponding to the face image to be matched, to serve as a matched image of the face image to be matched, and then perform service processing according to the face image to be matched and the matched image thereof. The first image is an original image acquired by the service processing module.

Optionally, in a possible implementation of this embodiment, in 102, the face recognition module may specifically perform a quality detection on each face image in the face image buffer queue according to preconfigured face standard parameters, such as light, a pose, or the like, so as to determine the face image to be matched from the face image buffer queue to serve as an optimal face image.

Optionally, in a possible implementation of this embodiment, after 103, the face recognition module may further delete the face image to be matched from the face image buffer queue.

Therefore, by deleting the selected face image to be matched from the maintained face image buffer queue in time by the face recognition module, memory resources occupied by maintaining the face image buffer queue may be effectively reduced.

After determining the matched image of the face image to be matched, the service processing module may further delete the matched image of the face image to be matched from the background image buffer queue, thereby effectively guaranteeing synchronization of the image queues maintained by the face recognition module and the service processing module.

In this embodiment, a face recognition module and a service processing module maintains respectively an image buffer queue; that is, the face recognition module maintains the face image buffer queue of face images, and the service processing module maintains the background image buffer queue of background images, i.e., first images; since the face recognition module only maintains the face image buffer queue, only a determined optimal face image, i.e., a face image to be matched, is transmitted to the service processing module, and the service processing module determines a background image matched with the optimal face image transmitted by the face recognition module from the maintained background image buffer queue, thus performing the image recognition and image matching on the face appearing in the video source.

Figure 2:
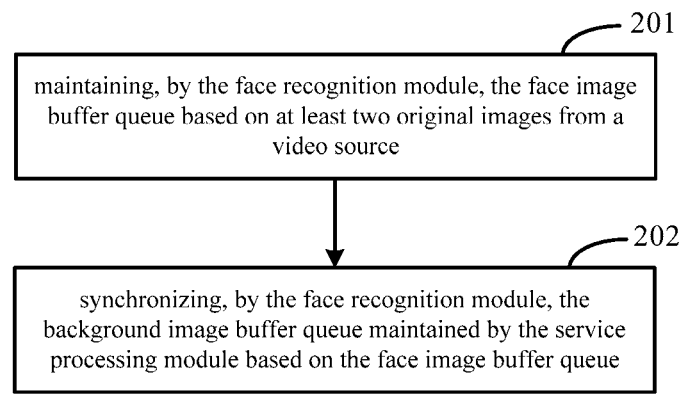
FIG. 2 is a schematic diagram according to a second embodiment of the present disclosure.

FIG. 2 is a schematic diagram according to a second embodiment of the present disclosure, and as shown in FIG. 2, compared with the first embodiment, before 101 in this embodiment, the face recognition module may further perform the following steps.

201: maintaining, by the face recognition module, the face image buffer queue based on at least two original images from the video source.

Each of the at least two original images includes a second timestamp.

In order to recognize the original image by the face recognition module and the service processing module simultaneously, the second timestamp ranging from 0 to 255 is added to the original image by hardware, such that the original image includes the second timestamp, and the original image with the second timestamp may be directly sent to the face recognition module and the service processing module respectively, without the need to transmit other additional timestamps independently, thereby improving the transmission efficiency.

202: synchronizing, by the face recognition module, the background image buffer queue maintained by the service processing module based on the face image buffer queue.

Optionally, in a possible implementation of this embodiment, in 201, the face recognition module receives the at least two original images from the video source as second images including the second timestamps. After receiving the second images, in order to globally and uniquely mark the original images, i.e., the second images, the face recognition module first adds the first timestamp ranging from 0 to infinity to each of the at least two second images.

After the first timestamps are added, the face recognition module may perform face detection on each second image to obtain a face detection result of each second image.

Specifically, the face recognition module may further use the face recognition technology to perform the face recognition on the original image, i.e., the first image, from the video source, so as to obtain one or more face images in the original image from the video source.

Generally, one or more face images may appear in one second image, and therefore, the face recognition result of the second image may include one face image or multiple face images. If the face recognition result of the second image includes one face image, the first timestamp and the second timestamp of the second image only correspond to the one face image; and if the face recognition result of the second image includes multiple face images, the first timestamp and the second timestamp of the second image may correspond to the multiple face images.

After the face detection result of each second image is obtained, the face recognition module may add the one or more face images included in the face detection result of each second image including the one or more face images, as well as the second timestamp and the first timestamp of the second image correspondingly into the face image buffer queue.

The face image buffer queue may include at least one face image as well as the first timestamp and the second timestamp corresponding to each of the at least one face image. The face image buffer queue is maintained by the face recognition module.

Optionally, in a possible implementation of this embodiment, in 202, the face recognition module may specifically send the second timestamp and the first timestamp of each second image, as well as the second timestamp and the first timestamp corresponding to each face image in the face image buffer queue to the service processing module.

In this implementation, the face recognition module sends sequentially to the service processing module the second timestamps and the first timestamps of several second images received from the video source together with the second timestamp and the first timestamp corresponding to each face image in the face image buffer queue.

In this embodiment, the service processing module receives the at least two original images from the video source as the first images including the second timestamps. After receiving the first images, for further processing, the service processing module first stores the at least two first images to obtain an original image storage queue, for example, a First Input First Output (FIFO) queue.

After receiving the second timestamp and the first timestamp of each second image sent by the face recognition module and the second timestamp and the first timestamp corresponding to each face image in the face image buffer queue, in response to determining that the second timestamp and the first timestamp of a second image of the second images are consistent with (such as the same as) the second timestamp and the first timestamp corresponding to a face image of the one or more face images in the face image buffer queue (or in other words, determining that the second timestamp and the first timestamp of a second image of the second images are included in the second and first timestamps corresponding respectively to the one or more face images in the face image buffer queue), the service processing module may add the first timestamp of the second image to the first image consistent with the second timestamp of the second image in the at least two first images, and add the first image to which the first timestamp is added, into the background image buffer queue.

The background image buffer queue may include at least one first image and the first timestamp corresponding to each of the at least one first image. The background image buffer queue is maintained by the service processing module.

In this embodiment, the service processing module may further perform optimization processing on the maintained background image buffer queue, and when different face images correspond to the same background image, the service processing module may buffer only one background image, which may effectively realize the reuse of the background image, thereby further reducing the memory resources occupied by maintaining the background image buffer queue.

In this embodiment, the face image buffer queue is maintained by the face recognition module, and then, the background image buffer queue maintained by the service processing module is synchronized based on the face image buffer queue, such that the face image buffer queue and the background image buffer queue may be kept synchronized correspondingly, thereby effectively improving the image processing efficiency.

Figure 3:
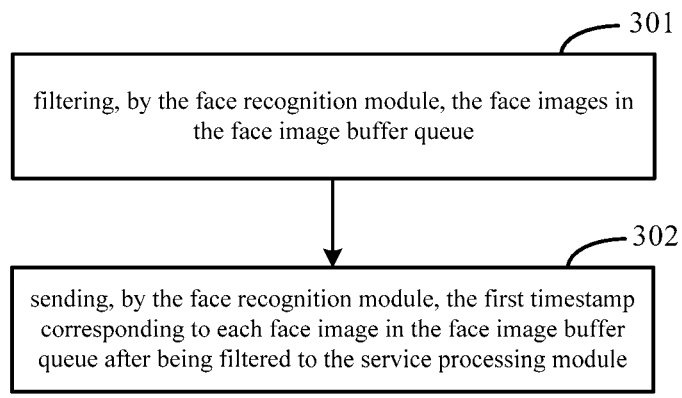
FIG. 3 is a schematic diagram according to a third embodiment of the present disclosure.

FIG. 3 is a schematic diagram according to a third embodiment of the present disclosure, and as shown in FIG. 3, compared with the first embodiment, in this embodiment, the face recognition module may further preform the following steps.

301: filtering, by the face recognition module, the one or more face images in the face image buffer queue.

302: sending, by the face recognition module, the first timestamp corresponding to each face image in the face image buffer queue after being filtered to the service processing module.

After receiving the first timestamp corresponding to each face image in the face image buffer queue after being filtered sent by the face recognition module, the service processing module may synchronize the first image in the background image buffer queue according to the first timestamp corresponding to each face image in the face image buffer queue after being filtered.

In this embodiment, in order to further reduce the memory resources occupied by maintaining the face image buffer queue and meanwhile further improve the image quality of each face image in the face image buffer queue, the face recognition module may further perform a filtering operation on each face image in the face image buffer queue with an existing image filtering technology at regular intervals or at appointed time, so as to filter out the face image with low image quality. After the filtering operation, the face recognition module may further send the first timestamp corresponding to each face image in the face image buffer queue after the filtering operation to the service processing module.

After receiving the first timestamp corresponding to each face image in the face image buffer queue after being filtered sent by the face recognition module, the service processing module may compare the first timestamp corresponding to each first image in the background image buffer queue with the first timestamp corresponding to each face image in the face image buffer queue after being filtered. In response to determining that the first timestamp of a first image of the first images is not to be consistent with (such as the same as) the first timestamp corresponding to any of the one or more face images in the face image buffer queue (in other words, determining that the first timestamp of a first image of the first images is not included in the first timestamps corresponding respectively to the one or more face images in the face image buffer queue), the service processing module may delete the first image from the background image buffer queue, thereby guaranteeing the synchronization of the background image buffer queue and the face image buffer queue.

In this embodiment, the face images in the maintained face image buffer queue are filtered by the face recognition module, and then, the first timestamp corresponding to each face image in the face image buffer queue after the filtering operation is sent to the service processing module, such that the service processing module may timely keep the maintained background image buffer queue in corresponding synchronization with the face image buffer queue maintained by the face recognition module, thereby effectively improving the image processing reliability and efficiency.

Figure 4:
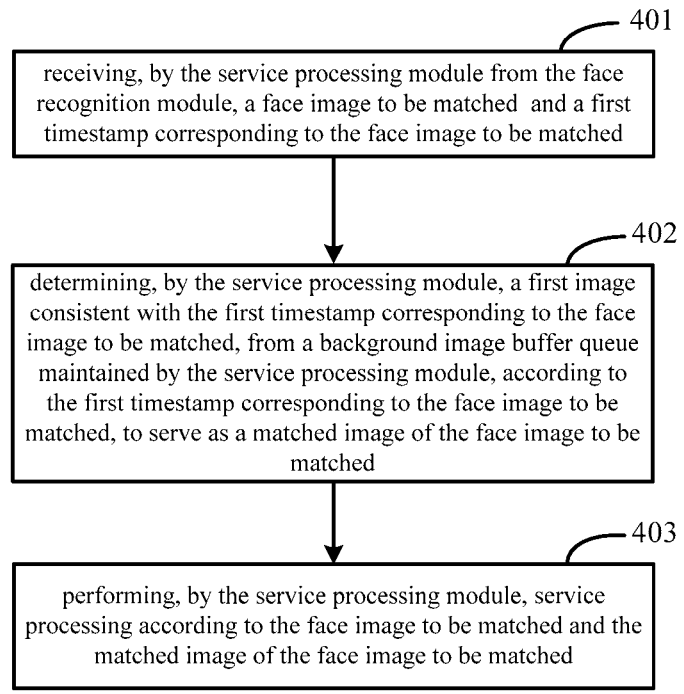
FIG. 4 is a schematic diagram according to a fourth embodiment of the present disclosure.

FIG. 4 is a schematic diagram according to a fourth embodiment of the present disclosure, and the face recognition module and the service processing module shown in FIG. 4 run on different hardware platforms.

401: receiving, by a service processing module from a face recognition module, a face image to be matched and a first timestamp corresponding thereto.

The face image to be matched is determined by the face recognition module from a face image buffer queue maintained by the face recognition module; and the face image buffer queue may include, but not limited to, one or more face images and a first timestamp corresponding to each of the one or more face images.

Each face image and the first timestamp corresponding thereto are obtained by the face recognition module based on original images from a video source.

After receiving the original images from the video source, in order to globally and uniquely mark the original images, the face recognition module may add the first timestamps ranging from 0 to infinity to the original images. Then, the face recognition module may further use a face recognition technology to perform the face recognition on the original image from the video source, so as to obtain the face image in the original image from the video source.

402: determining, by the service processing module, a first image consistent with the first timestamp corresponding to the face image to be matched, from a background image buffer queue maintained by the service processing module, according to the first timestamp corresponding to the face image to be matched, to serve as a matched image of the face image to be matched.

The first image is an original image acquired by the service processing module.

403: performing, by the service processing module, service processing according to the face image to be matched and the matched image thereof.

Optionally, in a possible implementation of this embodiment, in 403, the service processing module may specifically perform various service processing according to the face image to be matched and the matched image thereof, for example, directly outputting the face image to be matched and the matched image thereof, providing the face image to be matched and the matched image thereof to other processing modules, or the like.

Optionally, in a possible implementation of this embodiment, after 402, the service processing module may further delete the matched image of the face image to be matched from the background image buffer queue.

Therefore, by deleting the matched image of the face image to be matched from the maintained background image buffer queue in time by the service processing module, memory resources occupied by maintaining the background image buffer queue may be effectively reduced.

After sending the face image to be matched and the first timestamp corresponding to the face image to be matched to the service processing module, the face recognition module further deletes the face image to be matched from the face image buffer queue. Therefore, after determining the matched image of the face image to be matched, the service processing module may further delete the matched image of the face image to be matched from the background image buffer queue, thereby effectively guaranteeing synchronization of the image queues maintained by the face recognition module and the service processing module.

In this embodiment, the face recognition module and the service processing module maintains respectively an image buffer queue; that is, the face recognition module maintains the face image buffer queue of the face images, and the service processing module maintains the background image buffer queue of background images, i.e., the first images; since the face recognition module only maintains the face image buffer queue, only the determined optimal face image, i.e., the face image to be matched, is transmitted to the service processing module, and the service processing module determines the background image matched with the optimal face image transmitted by the face recognition module from the maintained background image buffer queue, thus performing the image recognition and image matching on the face appearing in the video source.

Figure 5:
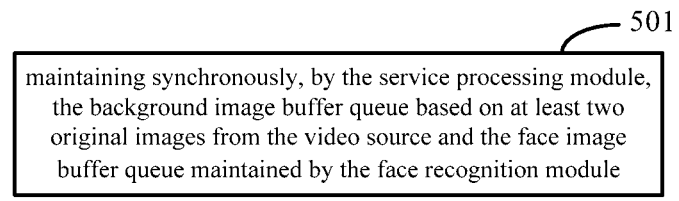
FIG. 5 is a schematic diagram according to a fifth embodiment of the present disclosure.

FIG. 5 is a schematic diagram according to a fifth embodiment of the present disclosure, and as shown in FIG. 5, compared with the fourth embodiment, before 401 in this embodiment, the service processing module may further preform the following steps.

501: maintaining synchronously, by the service processing module, the background image buffer queue based on at least two original images from a video source and the face image buffer queue maintained by the face recognition module.

Each of the at least two original images includes a second timestamp.

In order to recognize the original image by the face recognition module and the service processing module simultaneously, the second timestamp ranging from 0 to 255 is added to the original image by hardware, such that the original image includes the second timestamp, and the original image with the second timestamp may be directly sent to the face recognition module and the service processing module respectively, without the need to transmit other additional timestamps independently, thereby improving the transmission efficiency.

Optionally, in a possible implementation of this embodiment, in 501, the service processing module may specifically receive from the face recognition module the second timestamp and the first timestamp of each second image, as well as the second timestamp and the first timestamp corresponding to each face image in the face image buffer queue. Then, in response to determining that the second timestamp and the first timestamp of a second image of the second images are consistent with the second timestamp and the first timestamp corresponding to a face image of the one or more face images in the face image buffer queue, the service processing module may add the first timestamp of the second image to the first image consistent with the second timestamp of the second image in the at least two first images. Finally, the service processing module adds the first image to which the first timestamp is added into the background image buffer queue.

In this implementation, the face recognition module specifically maintains the face image buffer queue based on the at least two original images from the video source. Specifically, the face recognition module may receive the at least two original images from the video source as the second images including the second timestamps. After receiving the second images, in order to globally and uniquely mark the original images, i.e., the second images, the face recognition module first adds the first timestamp ranging from 0 to infinity to each of the at least two second images. After the first timestamps are added, the face recognition module may perform face detection on each second image to obtain a face detection result of each second image.

Specifically, the face recognition module may further use the face recognition technology to perform the face recognition on the original image, i.e., the first image, from the video source, so as to obtain the face image in the original image from the video source.

Generally, one or more face images may appear in one second image, and therefore, the face recognition result of the second image may include one face image or multiple face images. If the face recognition result of the second image includes one face image, the first timestamp and the second timestamp of the second image only correspond to the one face image; and if the face recognition result of the second image includes multiple face images, the first timestamp and the second timestamp of the second image may correspond to the multiple face images.

After the face detection result of each second image is obtained, the face recognition module may correspondingly add the one or more face images included in the face detection result of each second image including the one or more face images, as well as the second timestamp and the first timestamp of the second image into the face image buffer queue.

The face image buffer queue may include one or more face images as well as the first timestamp and the second timestamp corresponding to each of the one or more face images. The face image buffer queue is maintained by the face recognition module.

The face recognition module maintains the face image buffer queue, and may further send the second timestamp and the first timestamp of each second image, as well as the second timestamp and the first timestamp corresponding to each face image in the face image buffer queue to the service processing module.

In this implementation, the face recognition module sequentially sends to the service processing module, the second timestamps and the first timestamps of several second images received from the video source together with the second timestamp and the first timestamp corresponding to each face image in the face image buffer queue.

In this implementation, the service processing module receives the at least two original images from the video source as the first images including the second timestamps. After receiving the first images, for further processing, the service processing module first stores the at least two first images to obtain an original image storage queue, for example, a first input first output (FIFO) queue.

After receiving, from the face recognition module, the second timestamp and the first timestamp of each second image, as well as the second timestamp and the first timestamp corresponding to each face image in the face image buffer queue, in response to determining that the second timestamp and the first timestamp of a second image of the second images are consistent with the second timestamp and the first timestamp corresponding to a face image of the one or more face images in the face image buffer queue, the service processing module may add the first timestamp of the second image to the first image consistent with the second timestamp of the second image in the at least two first images, and add the first image to which the first timestamp is added to the background image buffer queue.

The background image buffer queue may include at least one first image and the first timestamp corresponding to each of the at least one first image. The background image buffer queue is maintained by the service processing module.

In this embodiment, the service processing module may further perform optimization processing on the maintained background image buffer queue, and when different face images correspond to a same background image, the service processing module may buffer only one background image, which may effectively realize the reuse of the background image, thereby further reducing the memory resources occupied by maintaining the background image buffer queue.

In this embodiment, the background image buffer queue is synchronously maintained by the service processing module based on the at least two original images from the video source and the face image buffer queue maintained by the face recognition module, such that the face image buffer queue and the background image buffer queue may be kept synchronized correspondingly, thereby effectively improving the image processing efficiency.

Figure 6:
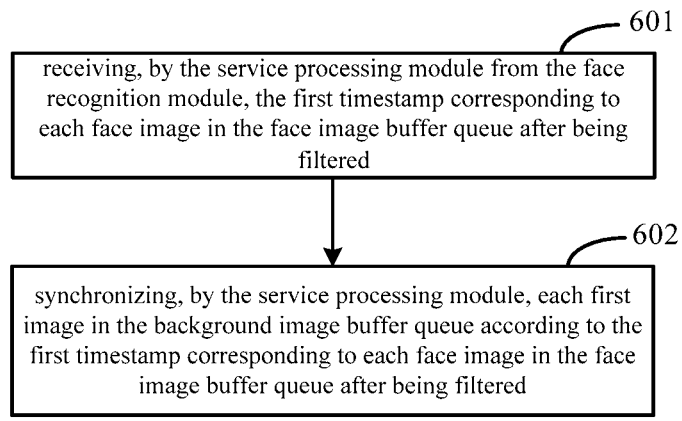
FIG. 6 is a schematic diagram according to a sixth embodiment of the present disclosure.

FIG. 6 is a schematic diagram according to a sixth embodiment of the present disclosure, and as shown in FIG. 6, compared with the fourth embodiment, in this embodiment, the service processing module may further preform the following steps.

601: receiving, by the service processing module from the face recognition module, the first timestamp corresponding to each face image in the face image buffer queue after being filtered.

602: synchronizing, by the service processing module, the first image in the background image buffer queue according to the first timestamp corresponding to each face image in the face image buffer queue after being filtered.

In this embodiment, in order to further reduce the memory resources occupied by maintaining the face image buffer queue and meanwhile further improve the image quality of each face image in the face image buffer queue, the face recognition module may further perform a filtering operation on each and all face images in the face image buffer queue with an existing image filtering technology at regular intervals or at appointed time, so as to filter out the face image with low image quality. After the filtering operation, the face recognition module may further send the first timestamp corresponding to each face image in the face image buffer queue after being filtered to the service processing module.

After receiving from the face recognition module the first timestamp corresponding to each face image in the face image buffer queue after being filtered, the service processing module may compare the first timestamp corresponding to each first image in the background image buffer queue with the first timestamp corresponding to each face image in the face image buffer queue after being filtered. In response to determining that the first timestamp of a first image of the first images is not consistent with the first timestamp corresponding to any of the one or more each face images in the face image buffer queue, the service processing module may delete the first image from the background image buffer queue, thereby guaranteeing the synchronization of the background image buffer queue and the face image buffer queue.

In this embodiment, the service processing module receives from the face recognition module the first timestamp corresponding to each face image in the face image buffer queue after being filtered, and then synchronizes the first image in the background image buffer queue according to the first timestamp corresponding to each face image in the face image buffer queue after being filtered, such that the service processing module may timely keep the maintained background image buffer queue in corresponding synchronization with the face image buffer queue maintained by the face recognition module, thereby effectively improving the image processing reliability and efficiency.

It should be noted that for simplicity of description, the above-mentioned embodiments of the method are described as combinations of a series of acts, but those skilled in the art should understand that the present disclosure is not limited by the described order of acts, as some steps may be performed in other orders or simultaneously according to the present disclosure. Further, those skilled in the art should also understand that the embodiments described in this specification are only exemplary embodiments and that acts and modules referred to are not necessary for the present disclosure.

In the above-mentioned embodiments, the descriptions of the respective embodiments have respective emphasis, and for parts that are not described in detail in a certain embodiment, reference may be made to the related descriptions of other embodiments.

Figure 7:
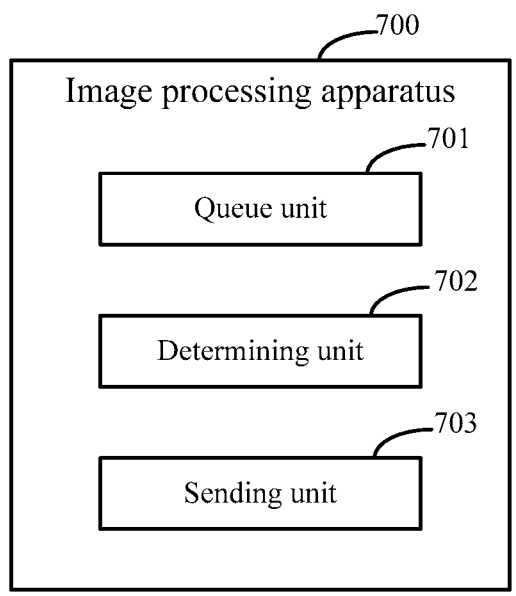
FIG. 7 is a schematic diagram according to a seventh embodiment of the present disclosure.

FIG. 7 is a schematic diagram according to a seventh embodiment of the present disclosure. With reference to FIG. 7, an image processing apparatus 700 according to this embodiment may be a face recognition module, which includes: a queue unit 701 configured to acquire a maintained face image buffer queue, herein the face image buffer queue includes at least one face image and a first timestamp corresponding to each of the at least one face image; and each face image and the first timestamp corresponding thereto are obtained by the image processing apparatus based on original images from a video source; a determining unit 702 configured to determine a face image to be matched from the face image buffer queue; and a sending unit 703 configured to send the face image to be matched and a first timestamp corresponding thereto to a service processing module, such that the service processing module determines a first image consistent with the first timestamp corresponding to the face image to be matched from a maintained background image buffer queue according to the first timestamp corresponding to the face image to be matched to serve as a matched image of the face image to be matched, and performs service processing according to the face image to be matched and the matched image thereof, and the first image is an original image acquired by the service processing module; and the image processing apparatus and the service processing module run on different hardware platforms.

Optionally, in a possible implementation of this embodiment, the queue unit 701 may further be configured to delete the face image to be matched from the face image buffer queue.

Optionally, in a possible implementation of this embodiment, the queue unit 701 may further be configured to maintain the face image buffer queue based on at least two original images from the video source, each of the at least two original images including a second timestamp, and synchronize the background image buffer queue maintained by the service processing module based on the face image buffer queue.

In an implementation, the queue unit 701 may be specifically configured to: receive the at least two original images as second images; add the first timestamp to each of the at least two second images; perform face detection on each second image to obtain a face detection result of each second image; and add one or more face images included in the face detection result of each second image including the one or more face images, as well as the second timestamp and the first timestamp of the second image correspondingly into the face image buffer queue.

In another implementation, the queue unit 701 may be specifically configured to send, to the service processing module, the second timestamp and the first timestamp of each second image as well as the second timestamp and the first timestamp corresponding to each face image in the face image buffer queue, such that the service processing module, in response to determining that the second timestamp and the first timestamp of a second image of the second images are consistent with the second timestamp and the first timestamp corresponding to a face image of the one or more face images in the face image buffer queue, adds the first timestamp of the second image to the first image consistent with the second timestamp of the second image in the at least two first images, and adds the first image to which the first timestamp is added, into the background image buffer queue.

Optionally, in a possible implementation of this embodiment, the queue unit 701 may further be configured to: filtering the one or more face images in the face image buffer queue; and send the first timestamp corresponding to each face image in the face image buffer queue after being filtered to the service processing module, such that the service processing module synchronizes the first image in the background image buffer queue according to the first timestamp corresponding to each face image in the face image buffer queue after being filtered.

It should be noted that the method according to the embodiment corresponding to any one of FIGS. 1 to 3 may be implemented by the image processing apparatus according to this embodiment. For detailed description, reference may be made to relevant contents in the embodiment corresponding to any one of FIGS. 1 to 3, and the detailed description is not repeated herein.

In this embodiment, the face recognition module and the service processing module maintains respectively an image buffer queue; that is, the face recognition module maintains the face image buffer queue of the face images, and the service processing module maintains the background image buffer queue of background images, i.e., the first images; since the face recognition module only maintains the face image buffer queue, only the determined optimal face image, i.e., the face image to be matched, is transmitted to the service processing module, and then, the service processing module determines the background image matched with the optimal face image transmitted by the face recognition module from the maintained background image buffer queue, thus performing the image recognition and image matching on the face appearing in the video source.

Figure 8:
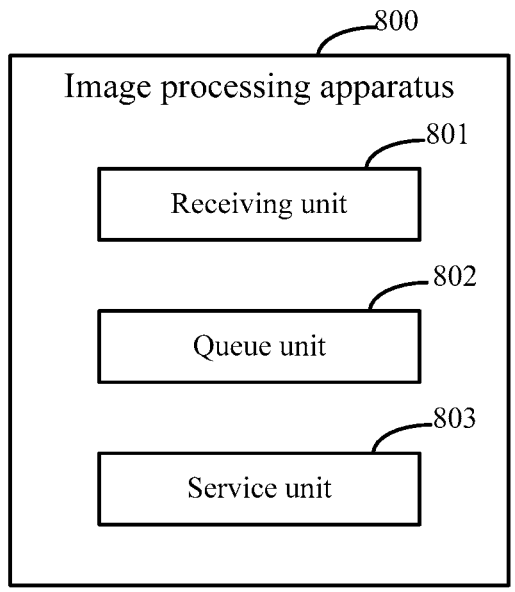
FIG. 8 is a schematic diagram according to an eighth embodiment of the present disclosure.

FIG. 8 is a schematic diagram according to an eighth embodiment of the present disclosure. With reference to FIG. 8, an image processing apparatus 800 according to this embodiment may be a service processing module, which may include: a receiving unit 801 configured to receive from a face recognition module a face image to be matched and a first timestamp corresponding thereto, and the face image to be matched is determined by the face recognition module from a maintained face image buffer queue; the face image buffer queue includes one or more face images and a first timestamp corresponding to each of the one or more face images; and each face image and the first timestamp corresponding thereto are obtained by the face recognition module based on original images from a video source; a queue unit 802 configured to determine a first image consistent with the first timestamp corresponding to the face image to be matched, from a maintained background image buffer queue, according to the first timestamp corresponding to the face image to be matched, to serve as a matched image of the face image to be matched, herein the first image is an original image acquired by the image processing apparatus; and a service unit 803 configured to perform service processing according to the face image to be matched and the matched image thereof; and the face recognition module and the image processing apparatus run on different hardware platforms.

Optionally, in a possible implementation of this embodiment, the queue unit 802 may further be configured to delete the matched image of the face image to be matched from the background image buffer queue.

Optionally, in a possible implementation of this embodiment, the queue unit 802 may further be configured to maintain synchronously the background image buffer queue based on at least two original images from the video source and the face image buffer queue maintained by the face recognition module, and each of the at least two original images includes a second timestamp.

In another implementation, the queue unit 802 may be specifically configured to: receive from the face recognition module the second timestamp and the first timestamp of each second image, as well as the second timestamp and the first timestamp corresponding to each face image in the face image buffer queue; and in response to determining that the second timestamp and the first timestamp of a second image of the second images are consistent with the second timestamp and the first timestamp corresponding to a face image of the one or more face images in the face image buffer queue, add the first timestamp of the second image to the first image consistent with the second timestamp of the second image in the at least two first images, and add the first image to which the first timestamp is added to the background image buffer queue.

Optionally, in a possible implementation of this embodiment, the queue unit 802 may further be configured to: receive from the face recognition module the first timestamp corresponding to each face image in the face image buffer queue after being filtered; and synchronize the first image in the background image buffer queue according to the first timestamp corresponding to each face image in the face image buffer queue after being filtered.

In an implementation, the queue unit 802 may be specifically configured to: compare the first timestamp corresponding to each first image in the background image buffer queue with the first timestamp corresponding to each face image in the face image buffer queue after being filtered; and in response to determining that the first timestamp of a first image of the first images is not consistent with the first timestamp corresponding to any of the one or more face images in the face image buffer queue, delete the first image from the background image buffer queue.

It should be noted that the method according to the embodiment corresponding to any one of FIGS. 4 to 6 may be implemented by the image processing apparatus according to this embodiment. For detailed description, reference may be made to relevant contents in the embodiment corresponding to any one of FIGS. 4 to 6, and the detailed description is not repeated herein.

In this embodiment, the face recognition module and the service processing module maintains respectively an image buffer queue; that is, the face recognition module maintains the face image buffer queue of the face images, and the service processing module maintains the background image buffer queue of background images, i.e., the first images; since the face recognition module only maintains the face image buffer queue, only the determined optimal face image, i.e., the face image to be matched, is required to be transmitted to the service processing module, and then, the service processing module determines the background image matched with the optimal face image transmitted by the face recognition module from the maintained background image buffer queue, thus performing the image recognition and image matching on the face appearing in the video source.

According to embodiments of the present disclosure, there are also provided an electronic device and a non-transitory computer readable storage medium which stores computer instructions.

Figure 9:
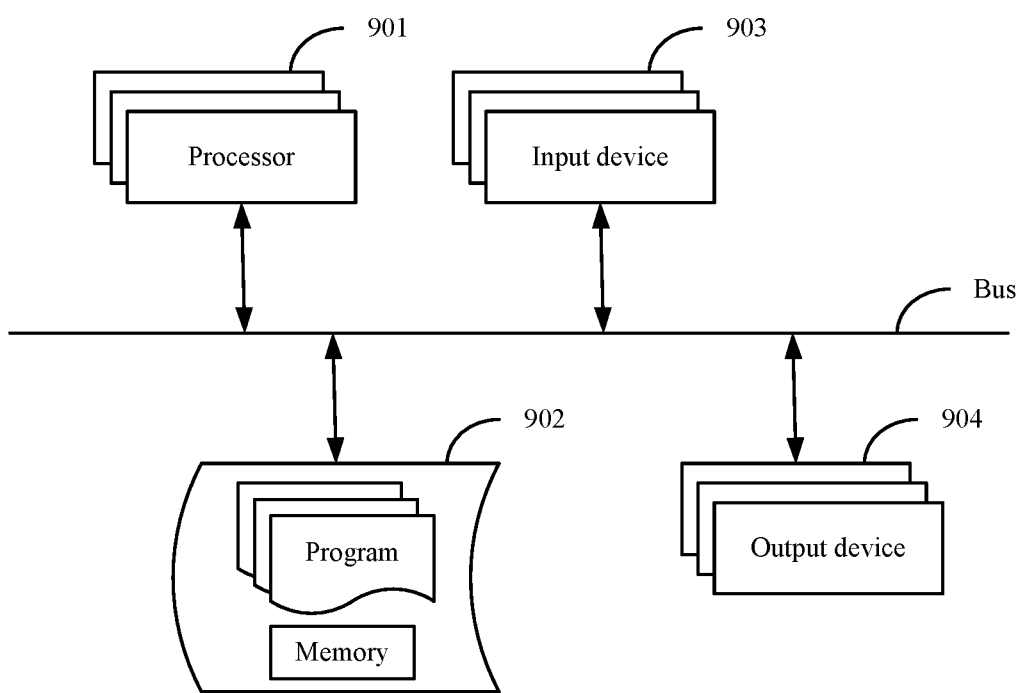
FIG. 9 is a schematic diagram of an electronic device configured to implement the image processing methods according to an embodiment of the present disclosure.

FIG. 9 is a schematic diagram of an electronic device configured to implement the image processing method according to the embodiments of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile devices, such as personal digital processors, cellular telephones, smart phones, wearable devices, and other similar computing devices. The components shown herein, their connections and relationships, and their functions, are meant to be exemplary only, and are not meant to limit implementation of the present disclosure described and/or claimed herein.

As shown in FIG. 9, the electronic device includes one or more processors 901, a memory 902, and interfaces configured to connect the components, including high-speed interfaces and low-speed interfaces. The components are interconnected using different buses and may be mounted at a common motherboard or in other manners as desired. The processor may process instructions for execution within the electronic device, including instructions stored in or at the memory to display graphical information for a graphical user interface (GUI) at an external input/output device, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 9, one processor 901 is taken as an example.

The memory 902 is configured as the non-transitory computer readable storage medium according to the present disclosure. The memory stores instructions which are executable by the at least one processor to cause the at least one processor to perform an image processing method according to the present disclosure. The non-transitory computer readable storage medium according to the present disclosure stores computer instructions for causing a computer to perform the image processing method according to the present disclosure.

The memory 902 which is a non-transitory computer readable storage medium may be configured to store non-transitory software programs, non-transitory computer executable programs and units, such as program instructions/units corresponding to the image processing method according to the embodiments of the present disclosure (for example, the queue unit 701, the determining unit 702 and the sending unit 703 shown in FIG. 7, or the receiving unit 801, the queue unit 802 and the service unit 803 shown in FIG. 8). The processor 901 executes various functional applications and data processing of a server, that is, implements the image processing method according to the above-mentioned embodiments, by running the non-transitory software programs, instructions, and units stored in the memory 902.

The memory 902 may include a program storage area and a data storage area, herein the program storage area may store an operating system and an application program required for at least one function; the data storage area may store data created according to use of the electronic device for implementing the image processing method according to the embodiments of the present disclosure, or the like. Furthermore, the memory 902 may include a high-speed random access memory, or a non-transitory memory, such as at least one magnetic disk storage device, a flash memory device, or other non-transitory solid state storage devices. In some embodiments, optionally, the memory 902 may include memories remote from the processor 901, and such remote memories may be connected via a network to the electronic device for implementing the image processing method according to the embodiments of the present disclosure. Examples of such a network include, but are not limited to, the Internet, intranets, local area networks, mobile communication networks, and combinations thereof.

The electronic device for the image processing method may further include an input device 903 and an output device 904. The processor 901, the memory 902, the input device 903 and the output device 904 may be connected by a bus or other means, and FIG. 9 takes the connection by a bus as an example.

The input device 903 may receive input numeric or character information and generate key signal input related to user settings and function control of the electronic device for implementing the image processing method according to the embodiments of the present disclosure, such as a touch screen, a keypad, a mouse, a track pad, a touch pad, a pointing stick, one or more mouse buttons, a trackball, a joystick, or the like. The output device 904 may include a display device, an auxiliary lighting device (for example, an LED) and a tactile feedback device (for example, a vibrating motor), or the like. The display device may include, but is not limited to, an LCD (liquid crystal display), an LED (light emitting diode) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmitting data and instructions to, a storage system, at least one input device, and at least one output device.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, PLDs (programmable logic devices)) for providing machine instructions and/or data to a programmable processor, including a machine readable medium which receives machine instructions as a machine readable signal. The term "machine readable signal" refers to any signal for providing machine instructions and/or data for a programmable processor.

To provide interaction with a user, the systems and technologies described here may be implemented on a computer having: a display device (for example, a cathode ray tube (CRT) or liquid crystal display (LCD) monitor) for displaying information to a user; and a keyboard and a pointing device (for example, a mouse or a trackball) by which a user may provide input for the computer. Other kinds of devices may also be used to provide interaction with a user; for example, feedback provided for a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: an LAN (local area network), a WAN (wide area network) and the Internet.

A computer system may include a client and a server. Generally, the client and the server are remote from each other and interact through the communication network. The relationship between the client and the server is generated by virtue of computer programs which run on respective computers and have a client-server relationship to each other.

With the technical solution of the embodiments of the present disclosure, in the embodiments of the present disclosure, each of the face recognition module and the service processing module maintains one image buffer queue; that is, the face recognition module maintains the face image buffer queue of the face images, and the service processing module maintains the background image buffer queue of background images, i.e., the first images; since the face recognition module only maintains the face image buffer queue, only the determined optimal face image, i.e., the face image to be matched, is required to be transmitted to the service processing module, and then, the service processing module matches the background image matched with the optimal face image transmitted by the face recognition module from the maintained background image buffer queue, thus performing the image recognition and image matching on the face appearing in the video source.

In addition, with the technical solution of the present disclosure, the face recognition module is not required to maintain the background image buffer queue, thus effectively avoiding the problem of memory resource waste caused when a large number of memory resources are occupied by maintaining the background image buffer queue, thereby reducing the hardware cost of the face recognition module.

In addition, with the technical solution of the present disclosure, the face recognition module is not required to maintain the background image buffer queue, thus effectively avoiding the problem of transmission resource waste caused when a large number of transmission resources are occupied by transmitting the background image buffer queue to the service processing module, thereby improving the image processing efficiency.

In addition, with the technical solution of the present disclosure, user experience may be improved effectively.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. An image processing method, comprising:
acquiring, by a face recognition module, a face image buffer queue maintained by the face recognition module, wherein the face image buffer queue comprises one or more face images and a first timestamp corresponding to each of the one or more face images; and each face image and the first timestamp corresponding to the face image are obtained by the face recognition module based on original images from a video source;
determining, by the face recognition module, a face image to be matched from the face image buffer queue; and
sending, by the face recognition module to a service processing module, the face image to be matched and the first timestamp corresponding to the face image to be matched, such that the service processing module determines a first image consistent with the first timestamp corresponding to the face image to be matched, from a background image buffer queue maintained by the service processing module, according to the first timestamp corresponding to the face image to be matched, to serve as a matched image of the face image to be matched, and performs service processing according to the face image to be matched and the matched image of the face image to be matched, wherein the first image is an original image acquired by the service processing module,
wherein the face recognition module and the service processing module run on different hardware platforms,
wherein the method further comprises: before acquiring, by the face recognition module, the face image buffer queue maintained by the face recognition module,
maintaining, by the face recognition module, the face image buffer queue based on at least two original images from the video source, wherein each of the at least two original images includes a second timestamp; and
synchronizing, by the face recognition module, the background image buffer queue maintained by the service processing module based on the face image buffer queue.

2. The method according to claim 1, further comprising:
after sending, by the face recognition module to the service processing module, the face image to be matched and the first timestamp corresponding to the face to be matched,
deleting, by the face recognition module, the face image to be matched from the face image buffer queue.

3. The method according to claim 1, wherein the maintaining, by the face recognition module, the face image buffer queue based on at least two original images from the video source comprises:

receiving, by the face recognition module, the at least two original images as second images;

adding, by the face recognition module, the first timestamp to each of the at least two second images;

performing, by the face recognition module, face detection on each second image to obtain a face detection result of each second image; and adding, by the face recognition module, one or more face images comprised in the face detection result of each second image comprising the one or more face images, as well as the second timestamp and the first timestamp of the second image correspondingly into the face image buffer queue.

4. The method according to claim 3, wherein the synchronizing, by the face recognition module, the background image buffer queue maintained by the service processing module based on the face image buffer queue comprises:

sending, by the face recognition module to the service processing module, the second timestamp and the first timestamp of each second image as well as the second timestamp and the first timestamp corresponding to each face image in the face image buffer queue, such that the service processing module, in response to determining that the second timestamp and the first timestamp of a second image of the second images are consistent with the second timestamp and the first timestamp corresponding to a face image of the one or more face images in the face image buffer queue, adds the first timestamp of the second image to the first image consistent with the second timestamp of the second image in the at least two first images, and adds the first image to which the first timestamp is added, into the background image buffer queue.

5. The method according to claim 1, further comprising:
filtering, by the face recognition module, the one or more face images in the face image buffer queue; and sending, by the face recognition module, the first timestamp corresponding to each face image in the face image buffer queue after being filtered to the service processing module, such that the service processing module synchronizes the first image in the background image buffer queue according to the first timestamp corresponding to each face image in the face image buffer queue after being filtered.

6. An image processing method, comprising:
receiving, by a service processing module from a face recognition module, a face image to be matched and a first timestamp corresponding to the face image to be matched, wherein the face image to be matched is determined by the face recognition module from a face image buffer queue maintained by the face recognition module; the face image buffer queue comprises one or more face images and a first timestamp corresponding to each of the one or more face images; and each face image and the first timestamp corresponding to each face image are obtained by the face recognition module based on original images from a video source;

determining, by the service processing module, a first image consistent with the first timestamp corresponding to the face image to be matched, from a background image buffer queue maintained by the service processing module, according to the first timestamp corresponding to the face image to be matched, to serve as a matched image of the face image to be matched, wherein the first image is an original image acquired by the service processing module; and performing, by the service processing module, service processing according to the face image to be matched and the matched image of the face image to be matched, wherein the face recognition module and the service processing module run on different hardware platforms, wherein the method further comprises: before receiving, by the service processing module from the face recognition module, the face image to be matched and a first timestamp corresponding to the face image to be matched, maintaining synchronously, by the service processing module, the background image buffer queue based on at least two original images from the video source and the face image buffer queue maintained by the face recognition module, wherein each of the at least two original images includes a second timestamp.

7. The method according to claim 6, further comprising:
after determining, by the service processing module, the first image consistent with the first timestamp corresponding to the face image to be matched, from the background image buffer queue maintained by the service processing module, according to the first timestamp corresponding to the face image to be matched, to serve as the matched image of the face image to be matched, deleting, by the service processing module, the matched image of the face image to be matched from the background image buffer queue.

8. The method according to claim 6, wherein maintaining synchronously, by the service processing module, the background image buffer queue based on at least two original images from the video source and the face image buffer queue maintained by the face recognition module comprises:

receiving, by the service processing module from the face recognition module, the second timestamp and the first timestamp of each second image, as well as the second timestamp and the first timestamp corresponding to each face image in the face image buffer queue;

in response to determining that the second timestamp and the first timestamp of a second image of the second images are consistent with the second timestamp and the first timestamp corresponding to a face image of the one or more face images in the face image buffer queue, adding, by the service processing module, the first timestamp of the second image to the first image consistent with the second timestamp of the second image in the at least two first images; and adding, by the service processing module, the first image to which the first timestamp is added, into the background image buffer queue.

9. The method according to claim 6, further comprising:
receiving, by the service processing module from the face recognition module, the first timestamp corresponding to each face image in the face image buffer queue after being filtered; and synchronizing, by the service processing module, the first image in the background image buffer queue according to the first timestamp corresponding to each face image in the face image buffer queue after being filtered.

10. The method according to claim 9, wherein synchronizing, by the service processing module, the first images in the background image buffer queue according to the first timestamp corresponding to each face image in the face image buffer queue after being filtered comprises:

comparing, by the service processing module, the first timestamp corresponding to each first image in the background image buffer queue with the first timestamp corresponding to each face image in the face image buffer queue after being filtered; and in response to determining that the first timestamp of a first image of the first images is not consistent with the first timestamp corresponding to any of the one or more face images in the face image buffer queue, deleting, by the service processing module, the first image from the background image buffer queue.

11. An electronic device, comprising:

at least one processor;

a memory connected with the at least one processor communicatively;

wherein the memory stores instructions executable by the at least one processor to enable the at least one processor to carry out an image processing method, which comprises:

acquiring a face image buffer queue maintained by the electronic device, wherein the face image buffer queue comprises one or more face images and a first timestamp corresponding to each of the one or more face images; and each face image and the first timestamp corresponding to the face image are obtained by the electronic device based on original images from a video source;

determining a face image to be matched from the face image buffer queue; and sending, to a service processing module, the face image to be matched and the first timestamp corresponding to the face image to be matched, such that the service processing module determines a first image consistent with the first timestamp corresponding to the face image to be matched, from a background image buffer queue maintained by the service processing module, according to the first timestamp corresponding to the face image to be matched, to serve as a matched image of the face image to be matched, and performs service processing according to the face image to be matched and the matched image of the face image to be matched, wherein the first image is an original image acquired by the service processing module, wherein the electronic device and the service processing module run on different hardware platforms, wherein the method further comprises: before acquiring, by the face recognition module, the face image buffer queue maintained by the face recognition module, maintaining, by the face recognition module, the face image buffer queue based on at least two original images from the video source, wherein each of the at least two original images includes a second timestamp; and synchronizing, by the face recognition module, the background image buffer queue maintained by the service processing module based on the face image buffer queue.

12. The electronic device according to claim 11, wherein the method further comprises:

after sending, to the service processing module, the face image to be matched and the first timestamp corresponding to the face to be matched, deleting the face image to be matched from the face image buffer queue.

13. An electronic device, comprising:

at least one processor;

a memory connected with the at least one processor communicatively;

wherein the memory stores instructions executable by the at least one processor to enable the at least one processor to carry out an image processing method, which comprises:

receiving, from a face recognition module, a face image to be matched and a first timestamp corresponding to the face image to be matched, wherein the face image to be matched is determined by the face recognition module from a face image buffer queue maintained by the face recognition module; the face image buffer queue comprises one or more face images and a first timestamp corresponding to each of the one or more face images; and each face image and the first timestamp corresponding to each face image are obtained by the face recognition module based on original images from a video source;

determining a first image consistent with the first timestamp corresponding to the face image to be matched, from a background image buffer queue maintained by the electronic device, according to the first timestamp corresponding to the face image to be matched, to serve as a matched image of the face image to be matched, wherein the first image is an original image acquired by the electronic device; and performing service processing according to the face image to be matched and the matched image of the face image to be matched, wherein the face recognition module and the electronic device run on different hardware platforms, wherein the method further comprises: before receiving, by the service processing module from the face recognition module, the face image to be matched and a first timestamp corresponding to the face image to be matched, maintaining synchronously, by the service processing module, the background image buffer queue based on at least two original images from the video source and the face image buffer queue maintained by the face recognition module, wherein each of the at least two original images includes a second timestamp.

14. The electronic device according to claim 13, wherein the method further comprises:

after determining the first image consistent with the first timestamp corresponding to the face image to be matched, from the background image buffer queue maintained by the electronic device, according to the first timestamp corresponding to the face image to be matched, to serve as the matched image of the face image to be matched, deleting the matched image of the face image to be matched from the background image buffer queue.

15. A non-transitory computer readable storage medium comprising instructions which, when executed by a computer, cause the computer to carry out an image processing method, which comprises:

acquiring a face image buffer queue maintained by the electronic device, wherein the face image buffer queue comprises one or more face images and a first timestamp corresponding to each of the one or more face images; and each face image and the first timestamp corresponding to the face image are obtained by the electronic device based on original images from a video source;

determining a face image to be matched from the face image buffer queue; and sending, to a service processing module, the face image to be matched and the first timestamp corresponding to the face image to be matched, such that the service processing module determines a first image consistent with the first timestamp corresponding to the face image to be matched, from a background image buffer queue maintained by the service processing module, according to the first timestamp corresponding to the face image to be matched, to serve as a matched image of the face image to be matched, and performs service processing according to the face image to be matched and the matched image of the face image to be matched, wherein the first image is an original image acquired by the service processing module;

wherein the electronic device and the service processing module run on different hardware platforms, wherein the method further comprises: before acquiring, by the face recognition module, the face image buffer queue maintained by the face recognition module, maintaining, by the face recognition module, the face image buffer queue based on at least two original images from the video source, wherein each of the at least two original images includes a second timestamp; and synchronizing, by the face recognition module, the background image buffer queue maintained by the service processing module based on the face image buffer queue.

16. A non-transitory computer readable storage medium comprising instructions which, when executed by a computer, cause the computer to carry out an image processing method, which comprises:

receiving, from a face recognition module, a face image to be matched and a first timestamp corresponding to the face image to be matched, wherein the face image to be matched is determined by the face recognition module from a face image buffer queue maintained by the face recognition module; the face image buffer queue comprises one or more face images and a first timestamp corresponding to each of the one or more face images; and each face image and the first timestamp corresponding to each face image are obtained by the face recognition module based on original images from a video source;

determining a first image consistent with the first timestamp corresponding to the face image to be matched, from a background image buffer queue maintained by the electronic device, according to the first timestamp corresponding to the face image to be matched, to serve as a matched image of the face image to be matched, wherein the first image is an original image acquired by the electronic device; and performing service processing according to the face image to be matched and the matched image of the face image to be matched, wherein the face recognition module and the electronic device run on different hardware platforms, wherein the method further comprises: before receiving, by the service processing module from the face recognition module, the face image to be matched and a first timestamp corresponding to the face image to be matched, maintaining synchronously, by the service processing module, the background image buffer queue based on at least two original images from the video source and the face image buffer queue maintained by the face recognition module, wherein each of the at least two original images includes a second timestamp.

\* \* \* \* \*